(12) United States Patent
Alzamora et al.

(10) Patent No.: US 8,397,425 B1
(45) Date of Patent: Mar. 19, 2013

(54) FISHING HOOK DEVICE

(76) Inventors: Jason L. Alzamora, Naples, FL (US);
Gerardo Alzamora, Naples, FL (US)

( * ) Notice: Subject to any disclaimer, the term of this patent is extended or adjusted under 35 U.S.C. 154(b) by 310 days.

(21) Appl. No.: 12/953,866

(22) Filed: Nov. 24, 2010

(51) Int. Cl.
*A01K 85/16* (2006.01)
*A01K 83/00* (2006.01)

(52) U.S. Cl. ............... 43/42.02; 43/42.11; 43/42.27

(58) Field of Classification Search ............ 43/43.16, 43/43.2, 43.4, 42.02–42.04, 42.1, 42.11, 43/42.13, 42.14, 42.19, 42.2, 42.27, 42.37, 43/42.44, 42.5, 42.51, 44.82
See application file for complete search history.

(56) References Cited

U.S. PATENT DOCUMENTS

| | | | |
|---|---|---|---|
| 923,854 A | 6/1909 | Kenyon | |
| 1,239,724 A | 9/1917 | Reimers | |
| 1,333,318 A * | 3/1920 | Kenji | 43/42.13 |
| 1,830,080 A * | 11/1931 | Allen | 43/42.11 |
| 1,854,027 A * | 4/1932 | Gruenhagen | 43/42.06 |
| 1,857,312 A | 5/1932 | Kuehn | |
| 1,874,102 A | 8/1932 | Jacobs | |
| 2,697,295 A * | 12/1954 | Hinds | 43/44.8 |
| 2,763,085 A | 9/1956 | Caillier | |
| 4,870,775 A | 10/1989 | Schrader | |
| 7,065,918 B2 | 6/2006 | Leone | |

* cited by examiner

*Primary Examiner* — David Parsley
*Assistant Examiner* — Danielle Clerkley

(57) ABSTRACT

A fishing hook device featuring a hook shaft with an eyelet disposed on the first end and a first hook, second hook, and third hook each extending from the second end of the hook shaft. A first panel, a second panel, and a third panel are each pivotally attached to the hook shaft near the first end. The panels can pivot between a closed position wherein the panel is generally parallel to the hook shaft and an open position wherein the panel is pivoted upwardly and is generally perpendicular to the hook shaft. Spring-loaded wires are disposed in each panel extending from the first end to its respective second end.

6 Claims, 3 Drawing Sheets

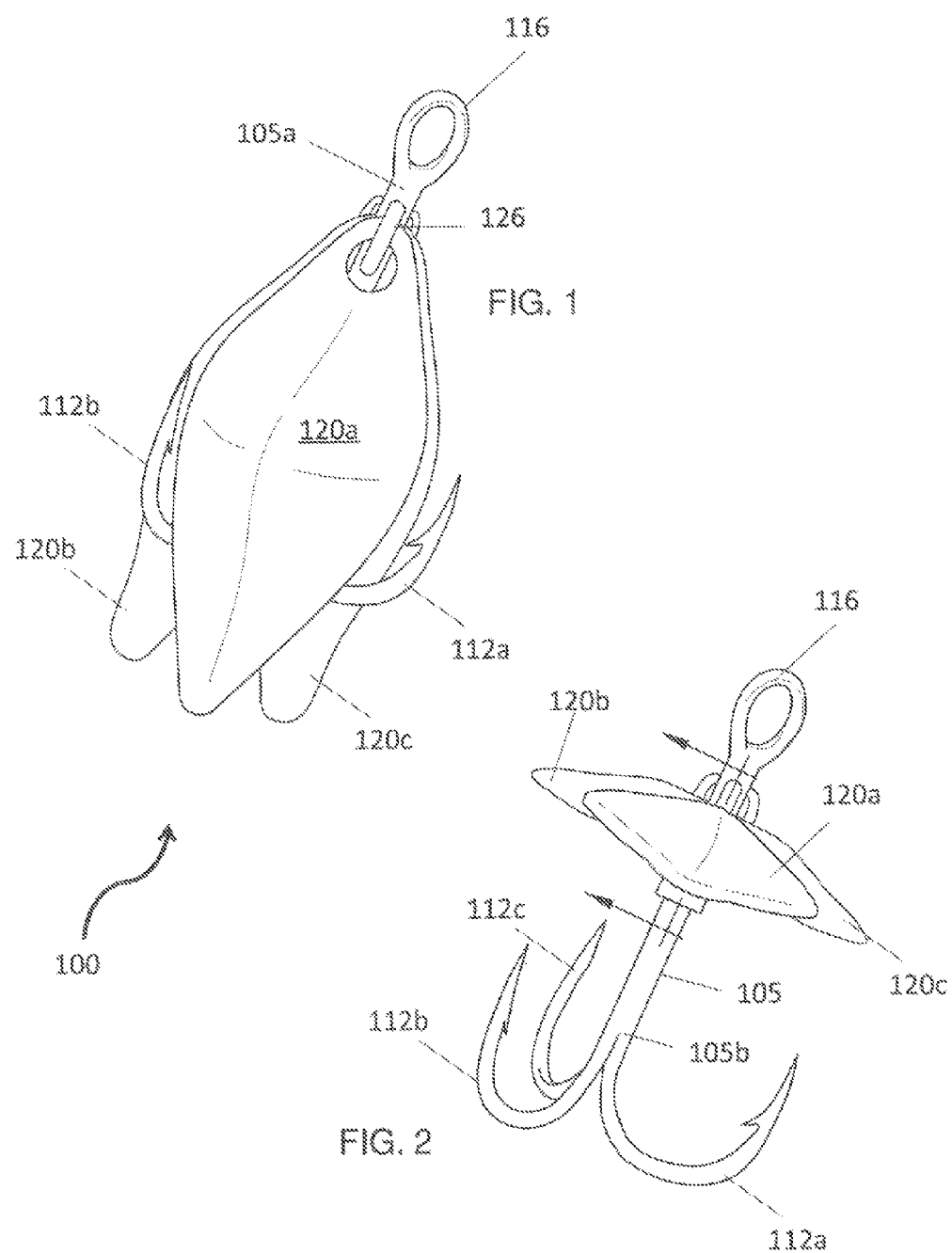

FISHING HOOK DEVICE

FIELD OF THE INVENTION

The present invention is directed to a fishing hook device, more particularly to a fishing hook with a plurality of pivoting panels that can move or flutter to help attract fish.

BACKGROUND OF THE INVENTION

A fisherman often wishes to attract attention to his/her bait hook. The present invention features a fishing hook device with a plurality of pivoting panels attached to a hook shaft. The panels can move, creating a fluttering motion, which attracts fish.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 1 is a perspective view of the fishing hook device of the present invention, wherein the panels are in the closed position.

FIG. 2 is a perspective view of the fishing hook device of the present invention, wherein the panels are in the open position.

DESCRIPTION OF PREFERRED EMBODIMENTS

Figure 3:
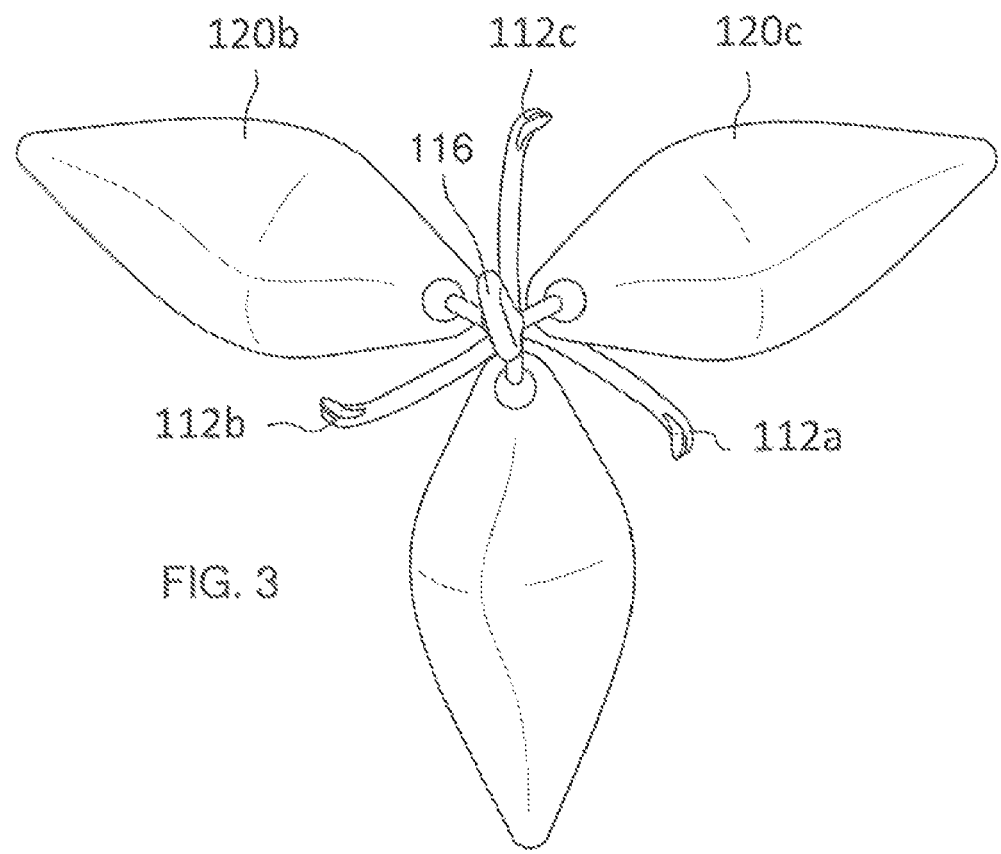
FIG. 3 is a top view of the fishing hook device of the present invention, wherein the panels are in the open position.

Referring now to FIGS. 1-6, the present invention features a fishing hook device 100. The fishing hook device 100 of the present invention comprises a main hook shaft 105 having a first end 105a and a second end 105b. Disposed on the first end 105a of the hook shaft 105 is an eyelet 116. The eyelet 116 is for attaching fishing line, for example. A set of three hooks (e.g., a first hook 112a, a second hook 112b, and a third hook 112c) is disposed on the second end 105b of the hook shaft 105. The hooks 112 extend (split off) from the second end 105 and curve upwardly towards the first end 105a of the hook shaft 105. Space exists between the hooks 112 and the hook shaft 105. The hooks each have a beveled, barbed, or pointed end (for catching fish, like standard hooks well known to one of ordinary skill in the art).

A first panel 120a, a second panel 120b, and a third panel 120c are each attached to the hook shaft 105 at the first end 105a. For example, the first end of the first panel 120a is pivotally attached to the hook shaft 105 at the first end 105a (e.g., via a first attachment means including but not limited to a clasp 126). The first panel 120a is elongated and is positioned in between the first hook 112a and the second hook 112b (e.g., see FIG. 1). The first end of the second panel 120b is pivotally attached to the hook shaft 105 at the first end 105a (e.g., via a second attachment means including but not limited to a clasp 126), for example next to the first panel 120a. The second panel 120b is elongated and is positioned in between the second hook 112b and the third hook 112c (e.g., see FIG. 3). The first end of the third panel 120c is pivotally attached to the hook shaft 105 at the first end 105a (e.g., via a third attachment means including but not limited to a clasp 126), for example in between the second panel 120b and first panel 120a. The third panel 120c is elongated and is positioned in between the third hook 112c and the first hook 112a (e.g., see FIG. 3).

The panels 120 can pivot between multiple positions including but not limited to a closed position wherein the panels are positioned in between the respective hooks 112 and the panels 120 are generally parallel to the hook shaft 105 (the hook shaft 105 is generally hidden) (see FIG. 1) and an open position, wherein the second ends of the panels 120 are pivoted upwardly such that the panels 120 are generally perpendicular to the hook shaft 105 and the hook shaft 105 is exposed (e.g., see FIG. 2. FIG. 3).

The panels 120 may be generally leaf-like in shape and appearance, for example the first ends and the second ends of the panels 120 may be tapered, creating an oval like or rounded diamond-like shape (see FIG. 3).

Figure 4:
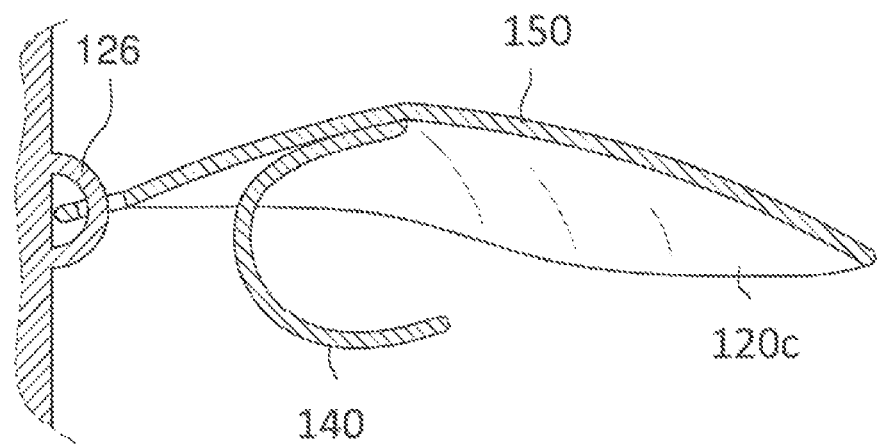
FIG. 4 is a side cross sectional view of the fishing hook device of the present invention.
Figure 5:
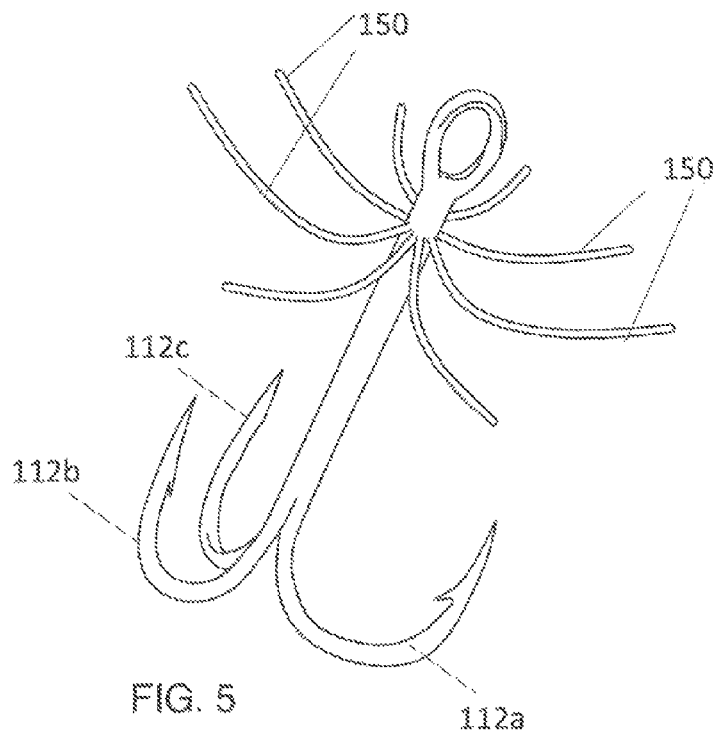
FIG. 5 is a perspective view of the fishing hook device of the present invention showing spring-loaded wires without the panels.

The panels 120 can be moved to the open position and maintain this position when placed in the water due. In some embodiments, spring-loaded wires 150 are disposed in the panels 120 (see FIG. 4, FIG. 5), for example running from the first ends of the panels 120 (or from the hook shaft 105) to the second ends of the panels 120. FIG. 4 shows a cross sectional view of a panel 120 with a spring-loaded wire 150 exposed. FIG. 5 shows the wires 150 without the panels 120. When the fishing hook device 100 is pulled through the water, the water forces the panels 120 to the closed position. In some embodiments, when a fish closes its mouth around the hooks 112, the panels 120 collapse to the closed position. In some embodiments, the device 100 comprises a skirt or trailer to allow for more pronounced fluttering action.

As shown in FIG. 4, in some embodiments, a U-shaped panel hook 140 is disposed on the bottom surface of one or more of the panels 120 or disposed on a spring-loaded wire 150. The U-shaped panel hook 140 may help facilitate movement of the panel 120 to the open position.

Figure 6:
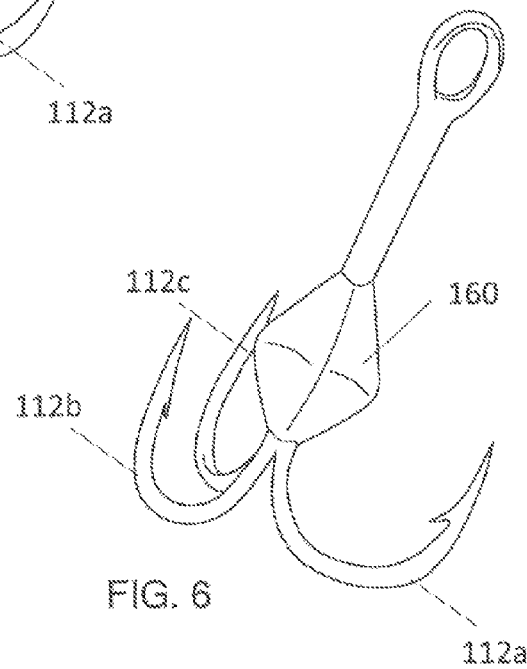
FIG. 6 is a perspective view of the fishing hook device of the present invention showing a weight attached to the hook shaft.

In some embodiments, the fishing hook device 100 of the present invention further comprises a weight 160, for example disposed on the hook shaft 105 (see FIG. 6). In some embodiments, the weight 160 is removable. The weight 160 may be, for example, between about 1 ounce to about 10 ounces (e.g., 3 ounces, 4 ounces, 5 ounces, 6 ounces, 7 ounces, etc.). The weight 160 is not limited to the aforementioned weights.

The device 100 of the present invention may be constructed from a variety of materials including but not limited to metal, plastic (e.g., engineered plastic), wood, the like, or a combination thereof. In certain embodiments, the panels 120 comprise a metallic material to reflect light in the water and attract fish.

In some embodiments, the fishing hook device 100 comprises only two panels 120. In some embodiments, the fishing hook device 100 comprises more than two panels 120.

As used herein, the term "about" refers to plus or minus 10% of the referenced number. For example, an embodiment wherein the weight 160 is about 10 ounces includes a weight that is between 9 and 11 ounces.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A fishing hook device comprising:
   (a) a hook shaft 105 having a first end 105*a* and a second end 105*b*;
   (b) an eyelet 116 disposed on the first end 105*a* of the hook shaft 105, the eyelet 116 is for attaching fishing line;
   (c) a first hook 112*a*, a second hook 112*b*, and a third hook 112*c* each extending from the second end 105*b* of the hook shaft 105, the hooks 112 each curve upwardly towards the first end 105*a* of the hook shaft 105, wherein each hook has a beveled, barbed, or pointed end;
   (d) a first panel 120*a*, a first end of the first panel 120*a* is pivotally attached to the hook shaft 105 via a first attachment means, the first panel 120*a* is elongated and is positioned in between the first hook 112*a* and the second hook 112*b*;
   (e) a second panel 120*b*, a first end of the second panel 120*b* is pivotally attached to the hook shaft 105 via a second attachment means, the second panel 120*b* is elongated and is positioned in between the second hook 112*b* and the third hook 112*c*;
   (f) a third panel 120*c*, a first end of the third panel 120*c* is pivotally attached to the hook shaft 105 via a second attachment means, the third panel 120*c* is elongated and is positioned in between the third hook 112*c* and the first hook 112*a*; and
   (g) spring-loaded wires 150 disposed in each panel 120 extending from the first end of each panel 120 to its respective second end;
   wherein panels 120 can each pivot between a closed position, wherein each panel 120 is positioned in between the respective hooks 112 and each panel 120 is generally parallel to the hook shaft 105, and an open position, wherein the second end of each panel 120 is pivoted upwardly such that each panel 120 is generally perpendicular to the hook shaft 105 and the hook shaft 105 is exposed.

2. The fishing hook device of claim 1, wherein the first attachment means, the second attachment means, and the third attachment means is a clasp 126.

3. The fishing hook device of claim 1 further comprising a weight 160 disposed on the hook shaft 105.

4. The fishing hook device of claim 3, wherein the weight 160 is removable.

5. The fishing hook device of claim 3, wherein the weight is between about 1 and 10 ounces.

6. The fishing hook device of claim 1 further comprising a U-shaped panel hook 140 disposed on a bottom surface of each panel 120.

* * * * *